April 13, 1926.
O. W. MOORE
1,580,151
RADIATOR CAP AND INDICATOR
Filed June 14, 1924
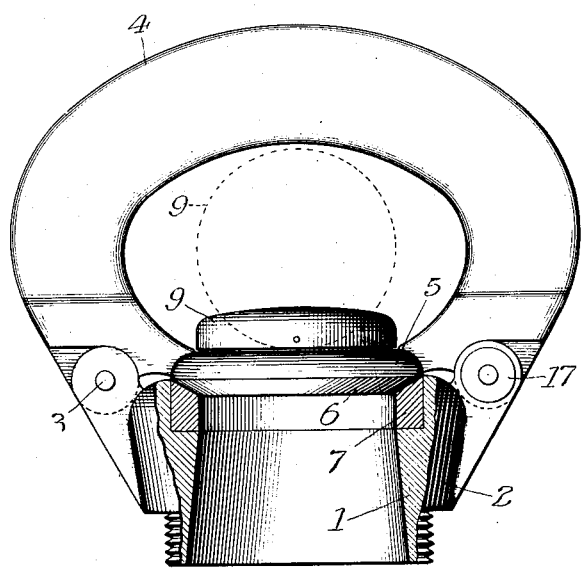
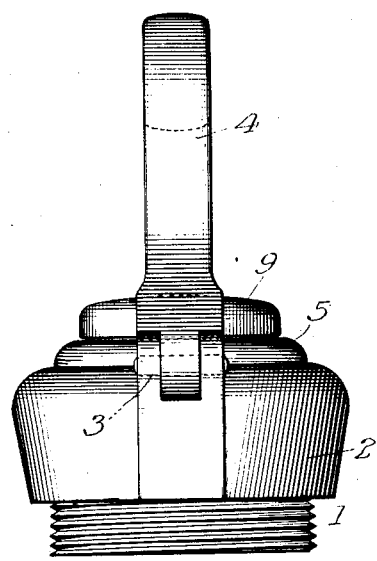
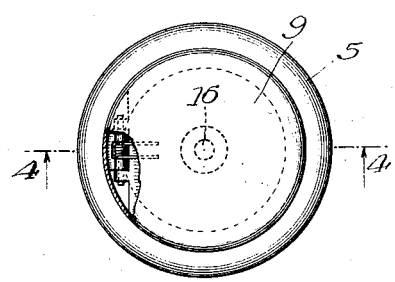
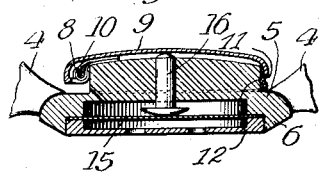
Witness
Martin H. Olsen
Inventor
Oscar W. Moore
By Rummler & Rummler
Atty.

Patented Apr. 13, 1926.

1,580,151

UNITED STATES PATENT OFFICE.

OSCAR W. MOORE, OF CHICAGO, ILLINOIS.

RADIATOR CAP AND INDICATOR.

Application filed June 14, 1924. Serial No. 719,987.

*To all whom it may concern:*

Be it known that I, OSCAR W. MOORE, a citizen of the United States of America, and a resident of Chicago, county of Cook, and State of Illinois, have invented a new and useful Improvement in Radiator Caps and Indicators, of which the following is a specification.

This invention relates to improved combined caps and indicators for automobile radiators. The device is adapted to close the filter spout of a radiator, and the purpose of the invention is to combine with the cap a simple means for indicating some one predetermined temperature of the radiator at the location of the cap.

The object of the invention is accomplished by the device as illustrated in the drawings, in which:—

Fig. 1 shows the construction in front elevation but partly in section.

Fig. 2 is a side view of the same.

Fig. 3 is a plan view partly broken away of the filler spout closing part of the structure.

Fig. 4 is a sectional detail taken on the line 4—4 of Fig. 3.

Numerous designs of thermometer casings or arrangements of temperature indicators, and various different warning signals have been provided for in some way indicating to a driver of a car when the water in the cooling system changes materially in temperature. The construction to which the present invention relates is a simple form of device of the same general class, amounting to merely a new and convenient form of cap, but which cap is provided with a pressure operated indicating device normally in non-indicating position, but which suddenly moves to full indicating position when affected by some definite predetermined temperature.

The temperature at which the device operates is that which corresponds to the development of a slightly more than atmospheric pressure in a radiator. Internal combustion engines, as a rule, may be safely operated when the temperature of the cooling water is quite close to boiling. It has lately become common practice to arrange for such conditions in the normal operation of an engine, this being considered desirable, not only for economy, but the engine should be designed for operation under such conditions, because when it is subjected to load the cooling water in the average system is bound to rise in temperature to near the boiling point. Therefore, a thermometer which is calibrated to indicate danger when steam rises from the cooling water due to its reaching a boiling temperature, does not fulfill its intended purpose, because the engine may not be in any danger of overheating. The present device does not indicate the different temperatures of the cooling water, but indicates only that temperature which corresponds to the development of some predetermined pressure within the radiator. Radiators are commonly provided with overflow outlets, but these are generally tubes of small diameter, and therefore do not prevent the development of the few ounces of pressure, or the fraction of an ounce of pressure, which is required to operate the indicator of the structure disclosed herein. This structure is arranged to signal or indicate at any desired definite temperature or pressure from the boiling point up. It is incapable of confusing a reader thereof due to slowly rising to a point indicating dangerous conditions. The present indicating device also overcomes the objection to thermometers and similar devices in indicating incorrect temperatures when used upon the caps of automobile radiator spouts. These caps contain more or less mass of metal, and are located in a position where they are much affected by the exterior atmospheric temperatures and the ability of the radiator and metallic parts in contact therewith in carrying away heat which would otherwise pass directly from the cooling medium to the thermometer. Therefore, in extremely cold weather a thermometer might be indicating a cool engine, whereas in fact the engine may be at an extremely high temperature, for example, in such cases where the cooling water boils due to lack of proper circulation because the lower return connection of the radiator may be stopped by ice.

The numeral 1 indicates an exteriorly threaded filler spout. The body part 2 of the cap is interiorly threaded to engage the thread of the filler spout, and hinged to the body part by the pin 3 is a curved handle 4, carrying preferably integral therewith a closing cap 5 for the filler spout. The lower surface of this cap is beveled at 6 to engage a coacting beveled rubber gasket 7, seated in the end of the filler spout. The cap or spout closing member 5 has hinged to it at 8, as indicated in Figs. 2 and 3, a dish-shaped flag or indicator 9. This indicator is normally urged upwardly to the dotted line position shown in Fig. 1 by a spring 10, Figs. 2 and 3, but is resiliently retained against moving upwardly by the inwardly pressed portion 11 thereof engaging a small recess 12 in the body part 5 of the cap.

In order to release the indicator only at some definite temperature, the body part 5 of the cap is recessed to receive a diaphragm 15. This diaphragm bears against a plunger 16 centrally located and slidably mounted within the cap 5 in position to engage the under surface of the indicator 9. When the diaphragm 15 moves upwardly upon a development of pressure within the radiator, which is sufficient to overcome resistance to movement of the indicator afforded by the retaining element 11, the indicator moves upwardly under the action of a spring 10 to a vertical position as indicated by the dotted lines in Fig. 1. The indicator, therefore, moves instantly from non-indicating position to full indicating position at some predetermined pressure or temperature within the radiator.

In order to move the cap out of the way when the radiator is being filled, it is swung as a whole around the hinge pin 3 after removing pin 17 at the opposite side of the cap.

Although but one specific embodiment of this invention has been herein shown and described, it will be understood that numerous details of the construction shown may be altered or omitted without departing from the spirit of this invention as defined by the following claims.

I claim:

1. A device of the class described including a spout closing member, an indicator hinged thereto, a spring for shifting said indicator from a normal position, means normally retaining said indicator in said normal position, a diaphragm mounted on said spout closing member, and a member operated by said diaphragm arranged to render said retaining means ineffective at a predetermined change in pressure within the spout.

2. A device of the class described comprising a body provided with an indicator movably mounted on said body, a spring for instantly shifting said indicator from non-indicating position to full indicating position, means for retaining said spring against operation, and pressure operated means for releasing said spring.

3. A device of the class described comprising a body provided with an indicator movably mounted on said body, means for instantly shifting said indicator from non-indicating position to full indicating position, a latch for normally retaining said indicator in non-indicating position, and fluid pressure operated means for rendering said retaining latch ineffective.

4. A device of the class described comprising a body provided with a handle extending upwardly from said body and arranged to provide an open space therein, an indicator movable into and out of indicating position within said space, means for instantly shifting said indicator from non-indicating to indicating position, a latch for normally retaining said indicator in non-indicating position, and a pressure operated element for controlling the operation of said latch.

Signed at Chicago this 27 day of May, 1924.

OSCAR W. MOORE.

DISCLAIMER.

1,580,151.—*Oscar W. Moore*, Chicago, Ill. RADIATOR CAP AND INDICATOR. Patent dated April 13, 1926. Disclaimer filed April 16, 1929, by the assignee, *The Motometer Company, Inc.*

Hereby enters this disclaimer to that part of the claim in said specification which is in the following words, to wit:

"1. A device of the class described including a spout closing member, an indicator hinged thereto, a spring for shifting said indicator from a normal position, means normally retaining said indicator in said normal position, a diaphragm mounted on said spout closing member, and a member operated by said diaphragm arranged to render said retaining means ineffective at a predetermined change in pressure within the spout.

"2. A device of the class described comprising a body provided with an indicator movably mounted on said body, a spring for instantly shifting said indicator from non-indicating position to full indicating position, means for retaining said spring against operation, and pressure operated means for releasing said spring.

"3. A device of the class described comprising a body provided with an indicator movably mounted on said body, means for instantly shifting said indicator from non-indicating position to full indicating position, a latch for normally retaining said indicator in non-indicating position, and fluid pressure operated means for rendering said retaining latch ineffective."

[*Official Gazette April 30, 1929.*]